Figure 1:
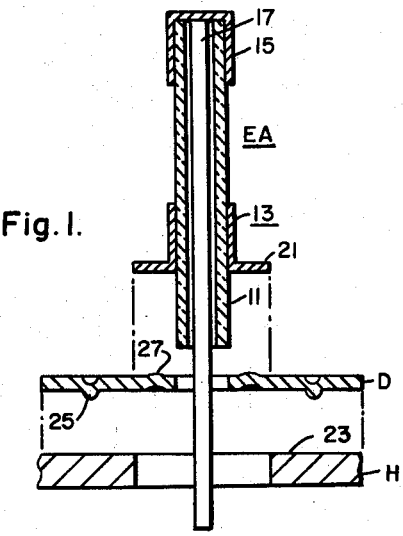

Sept. 1, 1964 M. W. FRANKE 3,147,361
VACUUM TIGHT JOINT AND METHOD OF MAKING SUCH JOINT
Filed June 15, 1962

WITNESSES:
Bernard R. Gieguez
James F. Young

INVENTOR
Milton W. Franke
BY
Hymen Diamond
ATTORNEY 3,147,361
VACUUM TIGHT JOINT AND METHOD OF
MAKING SUCH JOINT
Milton W. Franke, Horseheads, N.Y., assignor to Westinghouse Electric Corporation, East Pittsburgh, Pa., a corporation of Pennsylvania
Filed June 15, 1962, Ser. No. 202,715
8 Claims. (Cl. 219—117)

This invention relates to metals joining and has particular relationship to vacuum tight joints particularly suitable for vacuum tubes of the metallic-envelope type. Such tubes include an envelope having a header of mild or stainless steel into which one or more electrodes which must be insulated from the envelope extend. These electrodes are usually supported from an eyelet or a flanged tube to be joined vaccum tight to the envelope. An insulating ring or cylinder of a material such as glass, porcelain or the like is sealed vacuum tight to this eyelet or tube. The conductor from which the electrode is supported and which serves as a facility for supplying electrical potential to the electrode is usually sealed through the center of the glass or porcelain insulator.

Typically the apparatus here involved includes an eyelet of Kovar alloy (iron-nickel-cobalt in specified proportions) within which an insulator of a ceramic or of boro-silicate glass is sealed. For sealing purposes the insulator particularly if it is porcelain is usually coated with a metal such as silver and the eyelet is sealed to the insulator by brazing, the brazing compound producing a vacuum tight joint with the coating of the insulator. It is desirable that the brazing compound have an intermediate melting temperature. A typical brazing compound is BT alloy which is principally an alloy of copper and silver and is sold by Handy and Harman. This compound has a melting temperature of 779° C.

It is necessary that the Kovar eyelet be joined vacuum tight to the header which may be composed of mild or stainless steel. The flanged portion of the eyelet at which the joint is effected is relatively thin and the header is relatively thick. In accordance with the teachings of the prior art, attempts have been made to produce this joint by embossing the header in the region where the joint is to be produced and projection resistance welding the flange to the header. This has proved unsatisfactory because the header has a relatively high thermal conductivity and the heat necessary to produce the joint is so high that the flange is melted. Attempts to braze the Kovar alloy eyelet to the header have also proved unsatisfactory. The difficulty arises from the requirement that the brazing material for joining the eyelet to the header is copper or the like and the material has a melting temperature of about 1100° C. Attempts to reach this temperature cause the brazed joint between the eyelet and the insulator to flow and this joint is destroyed.

It is an object of this invention to provide a method free of the above described difficulties for providing a vacuum tight joint of an insulating eyelet assembly to be joined and it is a further object of this invention to provide such a joint which shall lend itself to the practice of this method.

In accordance with this invention, a joint is provided which includes in addition to the eyelet assembly carrying the insulator and the header, an intermediate plate or disc of about the same thickness as the flange of the eyelet assembly. This intermediate disc is brazed vacuum-tight to the thicker component and the thinner component carrying the insulator is projection welded to the intermediate component.

In the practice of this invention, the intermediate plate is embossed both where it is to be joined to the header and where the eyelet is to be joined to it. The intermediate plate is then first lightly welded to the header. The joining may be effected by tack welding at the embossed portion. Thereafter the intermediate plate is joined to the header by brazing with a brazing alloy such as copper. The joint produced is vacuum tight. The eyelet assembly is then joined to the intermediate plate by projection welding the flange of the eyelet to the intermediate plate at the embossing.

Figure 2:
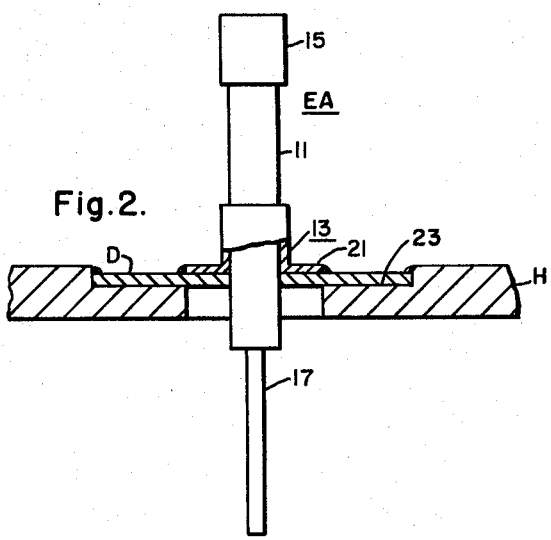

The novel features considered characteristic of this invention have been discussed generally above. The invention both as to its organization and as to its method of operation will be more clearly understood from the following description of a specific embodiment taken in connection with the accompanying drawing, in which:

FIGURE 1 is a view in section showing the parts of a preferred embodiment of this invention as they are related prior to an assembly operation in accordance with this invention; and FIG. 2 is a view in section of a terminal assembly in accordance with this invention.

The apparatus shown in the drawing prior to the joining operation includes an eyelet assembly EA made up of an insulator tube 11 of glass or ceramic or the like to the outer surface of which an eyelet 13 in the form of a flanged tube typically of Kovar alloy is joined vacuum tight typically by brazing with a brazing alloy of moderate melting temperature. A cap 15 for effecting an electrical connection is brazed to the top of the insulator 11 and a rod 17 from which an electrode (not shown) may be suspended is welded to the cap.

The apparatus also includes a header H which may be of substantially greater thickness than the flange 21 of the eyelet 13. The header H is flattened in the region 23 where the joint is to be produced and is in this region of different cross-sectional area than throughout.

In addition, the parts to be joined include a plate or disc D of about the same thickness as the flange 21 of the eyelet 13. This plate D, like the header H, typically is composed of mild or stainless steel. The plate D has an opening in its center. An embossed ring 25 extends from one surface of the plate adjacent to its outer rim. Another embossed ring 27 extends from the other surface of the plate adjacent the central opening.

In practing the invention, the plate D is disposed on the flat portion 23 of the header H and is secured to the header H by a light or low-power resistance weld or by tack welding. The joint is effected along the embossed portion 25 and the embossed portion is flattened during the welding operation. The joint between the plate and the header need not be vacuum tight. The plate D is then joined vacuum-tight to the header H by brazing with a relatively high temperature brazing alloy, for example, copper, preferably in a furnace. This joint B is vacuum tight. After the brazing is completed, the eyelet assembly EA is welded to the plate. The weld is a projection resistance weld produced at the embossing 27. The embossing is flattened during the welding operation. The heat required for producing the joint between the Kovar eyelet 13 and the plate D is relatively low and the Kovar eyelet remains intact, nor is the brazing component between the eyelet 13 and insulator 11 affected.

As disclosed herein this invention is applied principally to the producing of a vacuum-tight joint between an eyelet 11 having a small thickness and a header H having relatively larger thickness. One of the important aspects of this invention is that it may serve to join a thin assembly of a conductor and an insulator to a plate of non-uniform thickness, a portion of which is substantially greater than the thickness of the assembly. This invention may also serve to the joining of a material having a relatively low thermal conductivity to a material having a relatively high thermal conductivity. For example, the header could be composed of a metal having the same thickness as the eyelet flange 21 but having a thermal conductivity substantially greater than that of the flange.

While a preferred embodiment of this invention has been disclosed herein, many modifications thereof are feasible. This invention then is not to be restricted except insofar as is necessitated by the spirit of the prior art.

I claim as my invention:

1. A vacuum-tight joint between a first part and a second part, said first part being of substantially greater thickness than said second part and said second part including at least one component which would be damaged when subjected during substantial intervals to temperatures above a predetermined magnitude, the said joint including a third part of the approximate thickness of said second part joined to said first part by a vacuum-tight brazed joint at temperatures higher than said predetermined magnitude, said second part being welded vacuum tight to said third part by a welding operation throughout which said one component remains below said magnitude.

2. A vacuum-tight joint between a first part and a second part, the thermal conductivity of said first part being substantially greater than that of said second part and said second part including at least one component which would be damaged when subjected during substantial intervals to temperatures above a predetermined magnitude, the said joint including a third part of the approximate thermal conductivity of said second part joined to said first part by a vacuum-tight metallurgical joint formed at temperatures higher than said predetermined magnitude, said second part being welded vacuum-tight to said third part by a welding operation throughout which said one component remains below said magnitude.

3. The method of producing a vacuum-tight joint between a first part and a second part, said second part having a substantially lower thermal conductivity than said first part, said second part being such as would be damaged by being subjected during substantial intervals to temperatures above a predetermined magnitude, the said method comprising producing a third part having approximately the thermal conductivity of said second part, producing a first embossment on said third part extending from one surface thereof, producing a second embossment on said third part extending from the opposite surface thereof, projection resistance welding said third part to said first part along said first embossment at a relatively low heat such as to maintain said third part substantially intact, next brazing said third part to said first part at a temperature substantially higher than said magnitude to produce a vacuum-tight joint between said third part and first part, and thereafter projection resistance welding said second part to said third part along said second embossment to produce a vacuum tight joint between said second part and said third part by a welding operation throughout which said one component remains below said magnitude.

4. A vacuum-tight joint between a first part of non-uniform thickness and a second part of substantially uniform thickness, said first part being of substantially greater thickness than said second part in the region of said joint, said second part including at least one component which would be damaged when subjected during substantial intervals to temperatures above a predetermined magnitude, the said joint including a third part of the approximate thickness of said second part joined to said first part by a vacuum-tight metallurgical joint, formed at a temperature substantially higher than said magnitude, said second part being joined to said third part by a metallurgical vacuum-tight joint produced by a metallurgical joining operation throughout which said one component remains below said magnitude.

5. The method of producing a vacuum-tight joint between a first part of non-uniform thickness and a second part of uniform thickness, said first part being of substantially greater thickness than said second part in the region of said joint, said second part including at least one component which would be damaged when subjected during substantial intervals to temperatures substantially higher than a predetermined magnitude, the said method comprising first metallurgically joining a third part of the approximate thickness of said second part vacuum-tight to said first part at a temperature substantially higher than said magnitude, and after said third part has been so joined to said first part joining said second part metallurgically and vacuum-tight to said third part by a joining operation throughout which said one component remains below said magnitude.

6. The method of producing a vacuum-tight joint between a first part and a second part, said first part being substantially thicker than said second part, said second part including at least one component which would be damaged when subjected during substantial intervals to temperatures substantially higher than a predetermined magnitude, the said method comprising first metallurgically joining a third part of the approximate thickness of said second part vacuum tight to said first part at a temperature substantially higher than said magnitude, and after said third part has been so joined to said first part joining said second part to said third part by a metallurgical, vacuum-tight joint produced by a joining operation throughout which said one component remains below said magnitude.

7. A vacuum-tight joint between a first metallic part and an eyelet including a second metallic part into which a part of glass or the like is sealed, the thermal conductivity of said first part being substantially higher than that of said second part, the said joint including a third metallic part having a thermal conductivity about equal to that of said second part brazed vacuum tight to said first metallic part in the absence of said second part, said second part being joined to the brazed assembly of said first and third parts by being welded vacuum tight to said third part.

8. The method of producing a vacuum-tight joint between a first part and a second part, said first part having a substantially higher thermal conductivity than said second part, said second part including at least one component which would be damaged when subjected during substantial intervals to temperatures substantially higher than a predetermined magnitude, the said method comprising first metallurgically joining a third part of the approximate thermal conductivity of said second part vacuum-tight to said first part at a temperature substantially higher than said magnitude, and after said third part had been so joined to said first part joining said second part to said third part by a metallurgical vacuum-tight joint produced by a joining operation throughout which said one component remains below said magnitude.

References Cited in the file of this patent

UNITED STATES PATENTS

| 2,124,428 | Nolte | July 19, 1938 |
| 2,137,097 | Sateren | Nov. 15, 1938 |
| 2,174,682 | Beggs | Oct. 3, 1939 |
| 2,178,747 | Espe | Nov. 7, 1939 |
| 2,184,939 | Green | Dec. 26, 1939 |
| 2,308,377 | Marshall et al. | Jan. 12, 1943 |
| 3,049,792 | Kohl | Aug. 21, 1962 |